United States Patent
Rockenfeller et al.

(10) Patent No.: US 6,705,111 B1
(45) Date of Patent: Mar. 16, 2004

(54) AMMONIA-WATER ABSORPTION SYSTEM WITH PLUNGER-DRIVEN DIAPHRAGM SOLUTION PUMP

(75) Inventors: Uwe Rockenfeller, Boulder City, NV (US); Paul Sarkisian, Boulder City, NV (US); William T. Dooley, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 10/340,918

(22) Filed: Jan. 9, 2003

(51) Int. Cl.[7] ............................................. F25B 15/00
(52) U.S. Cl. ........................................ 62/476; 62/324.2
(58) Field of Search ........................... 62/476, 101, 498, 62/116, 118, 324.2

(56) References Cited

U.S. PATENT DOCUMENTS

| | | | | |
|---|---|---|---|---|
| 3,354,831 A | * | 11/1967 | Acker et al. ................ | 417/387 |
| 3,491,551 A | * | 1/1970 | Frohbieter ................... | 62/476 |
| 3,526,102 A | * | 9/1970 | Boylett et al. .............. | 62/259.3 |
| 3,539,277 A | * | 11/1970 | Andrews et al. ............ | 417/473 |
| 3,763,663 A | * | 10/1973 | Schlichtig ................... | 62/498 |
| 4,648,810 A | * | 3/1987 | Schippers et al. .......... | 417/383 |
| 5,367,884 A | | 11/1994 | Phillips et al. ............... | 62/101 |
| 5,490,393 A | | 2/1996 | Fuesting et al. ............ | 62/101 |
| RE36,684 E | * | 5/2000 | Rockenfeller et al. ..... | 62/324.2 |

OTHER PUBLICATIONS

Modahl, et al. *"Evaluation of a Commercial Advanced Absorption Heat Pump Breadboard"* pp. 117–125, 1988.

* cited by examiner

Primary Examiner—William C. Doerrler
(74) Attorney, Agent, or Firm—Knobbe, Martens, Olson & Bear, LLP

(57) ABSTRACT

An ammonia-water absorption system uses plunger driven spring return diaphragm to pump absorption solution.

11 Claims, 3 Drawing Sheets

AMMONIA-WATER ABSORPTION SYSTEM WITH PLUNGER-DRIVEN DIAPHRAGM SOLUTION PUMP

BACKGROUND OF THE INVENTION

Liquid/vapor absorption systems using ammonia refrigerant, referred to as ammonia-water or aqua-ammonia systems, are well known in the art. These systems utilize absorber heat exchange or generator/absorber heat exchange (GAX) cycles for supplying cooling, and heating to an indoor coil and other heat exchange components exposed to the space or load to be conditioned. Examples of aqua-ammonia absorption heat pumps using GAX cycles are disclosed in U.S. Pat. Nos. Re. 36,684, 5,367,884 and Modahl et al., "Evaluation of a Commercial Advanced Absorption Heat Pump Bread Board," 1988. In such apparatus, a solution pump is used to pump ammonia-rich absorption fluid from the absorber assembly to the generator assembly, and maintains pressure differentials between the low pressure, absorber side to the high pressure, generator side of the absorption system apparatus. Diaphragm pumps using a hydraulically driven diaphragm are commonly used as solution pumps. Such hydraulic diaphragm pumps rely on internal pressures of the system and atmospheric pressure for returning the diaphragm and for cycling operation of the pump. Moreover, due to internal pump friction, such pumps are capable of operating only at atmospheric pressures above about 1.1–1.2 atmospheres. Although such pumps function adequately where the system operates to provide cooling and at relatively high ambient temperatures with relatively high suction pressures, e.g., 55 to 100 psia, at low temperature heating operations, with relatively low solution pressures, e.g., as low as 8 psia, such presently used hydraulic diaphragm pumps often do not perform. Correspondingly, presently used diaphragm pumps do not operate efficiently, if at all, at solution temperatures below 35° F. thereby substantially limiting their use for low temperature condition heat pumping and refrigeration.

SUMMARY OF THE INVENTION

The apparatus described herein uses a plunger-driven diaphragm solution pump in an absorption fluid loop for pumping absorption fluid having an ammonia concentration of between about 20% and about 60% by weight, from the absorber assembly to the generator assembly. Such a solution pump is capable of operating at high discharge temperatures and pressures to provide cooling as well as at low pressures where the heat pump system operates to provide heating.

DETAILED DESCRIPTION OF THE PREFERRED EMBODIMENTS

Figure 1:
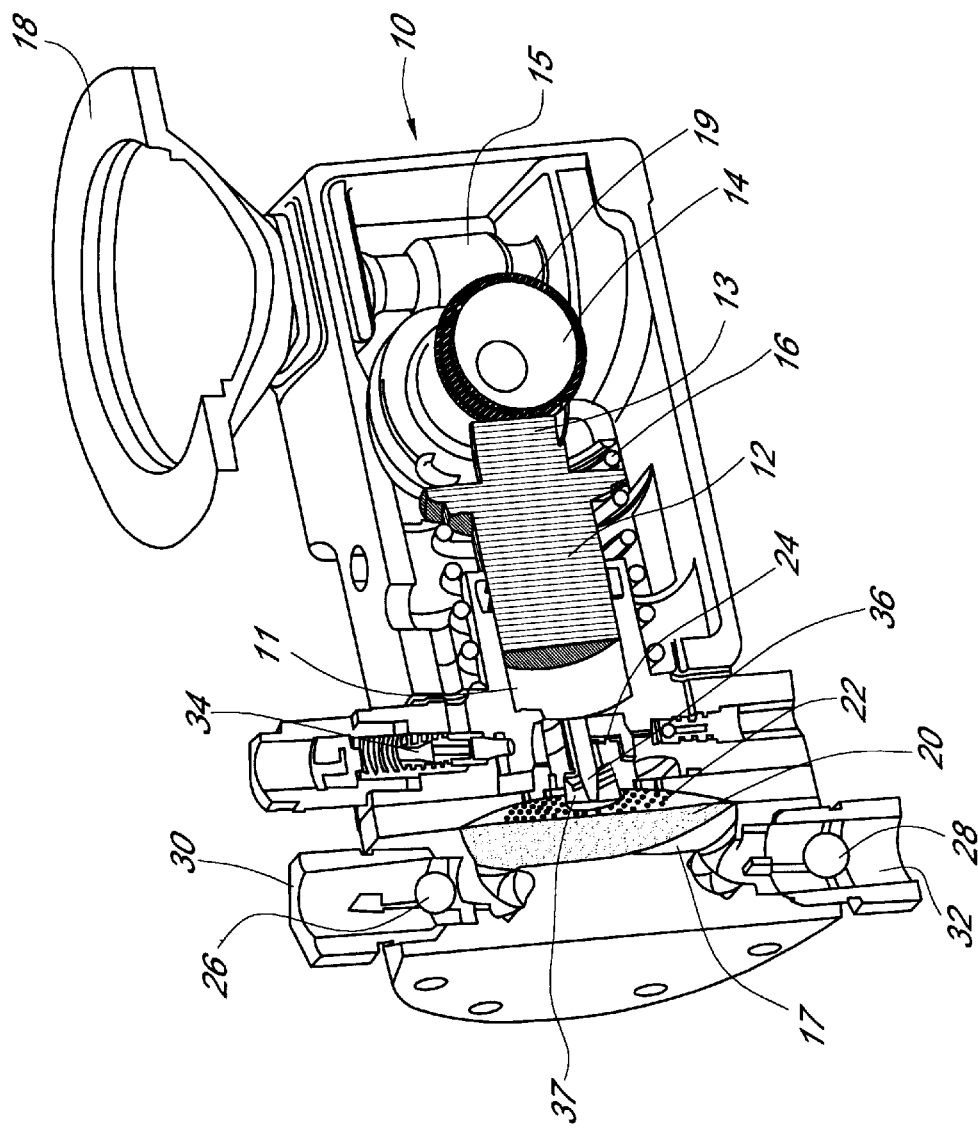
FIG. 1 is a cut-away view of a plunger-driven diaphragm solution pump used in the ammonia-water absorption apparatus described herein.

The solution pump illustrated in FIG. 1 utilizes a plunger or piston 12 having one end which rides along eccentric bearing 14, and another end which operates diaphragm 20. The rotation of eccentric cam and bearing 14 is driven by gear 15 operated by a motor (not shown) secured on motor mount 18. Suitable drive gearing between gear 15 and a gear mounted on the shaft holding eccentric cam and bearing 14 provides rotation to the cam and causes plunger 12 to be operated reciprocally. The cam 14 shown includes a needle bearing assembly 19 providing rolling contact with the plunger. The plunger is biased by spring 16 so that the surface of end 13 of the plunger is urged against eccentric bearing 14. As eccentric bearing 14 is rotated, plunger 12 is operated reciprocally within sleeve 11. The reciprocal motion of the plunger causes diaphragm 20 to deflect inward and outward relative to solution chamber 17 thereby effecting the volume of the solution chamber. When the diaphragm is deflected into the chamber, absorption fluid in the chamber is forced past ball check valve 26 through outlet 30 pipe and into an absorption fluid conduit. When plunger 12 is retracted, the diaphragm retracts drawing absorption fluid from the absorber into the chamber 17 via inlet pipe 32 and ball check valve 28. Replenishment valve 36 is operated by contact with the retracting diaphragm at pressure pad 37 to insure that replenishment hydraulic fluid is not allowed into the chamber 22 unless the diaphragm is in the fully retracted position. The pump also includes a hydraulic fluid chamber 22 containing hydraulic fluid on the side of the diaphragm opposite the solution chamber 17. The hydraulic fluid which fills hydraulic fluid chamber 22 assists in returning the diaphragm from the outwardly deflected condition to an inwardly deflected state when plunger 12 is retracted. Replenishing check valve 24 cooperates with air bleed/relief valve assembly 34 to maintain a full charge of hydraulic fluid in the hydraulic fluid chamber. Hydraulic fluid replenishment may occur as hydraulic fluid and any air present is discharged to the crankcase through the air bleed/relief valve assembly 34 during each cycle of the plunger reciprocation.

Figure 2:
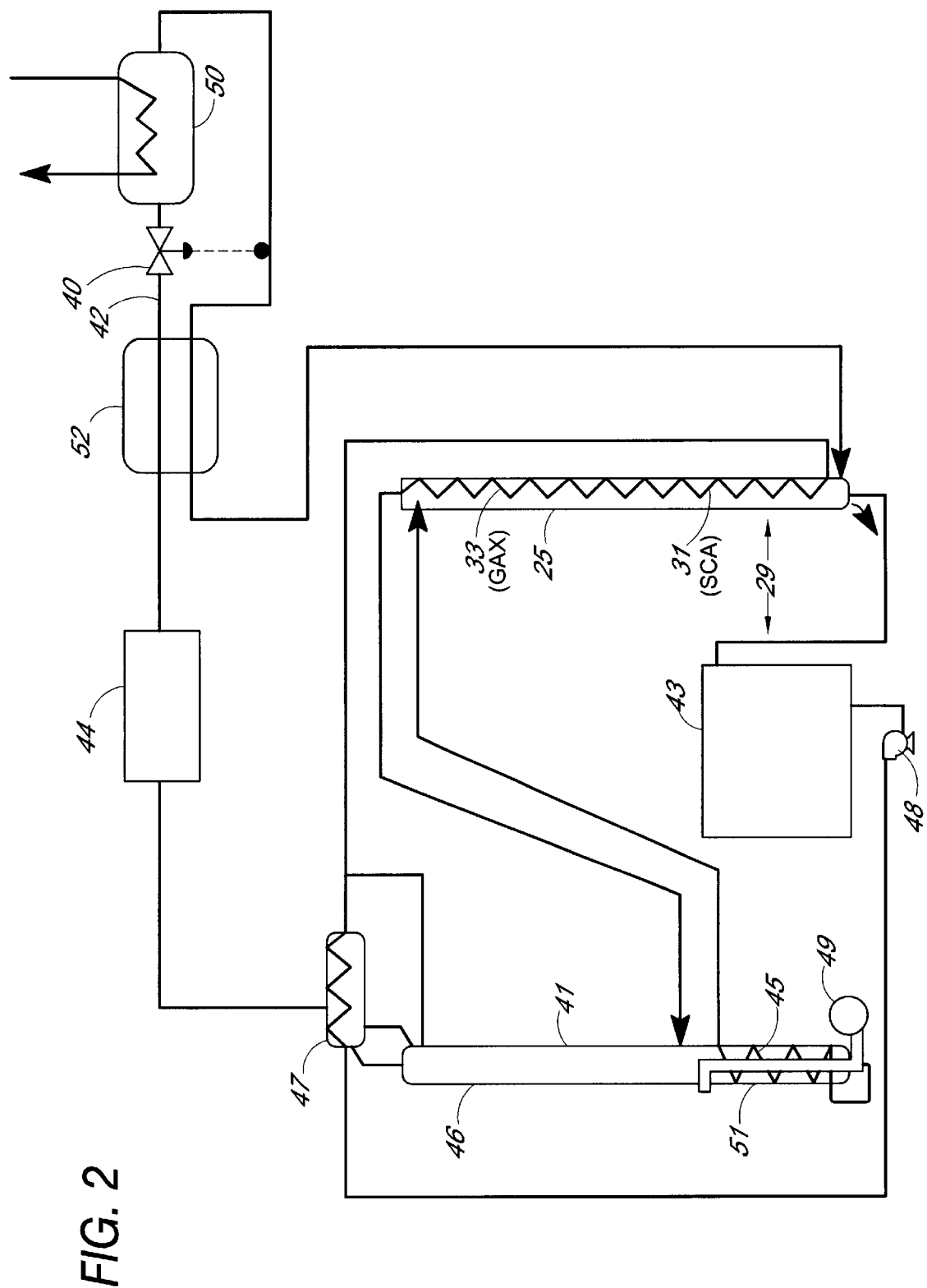
FIGS. 2 and 3 are schematic illustrations of examples of aqua-ammonia absorption systems using a solution pump of the type shown in FIG. 1.
Figure 3:
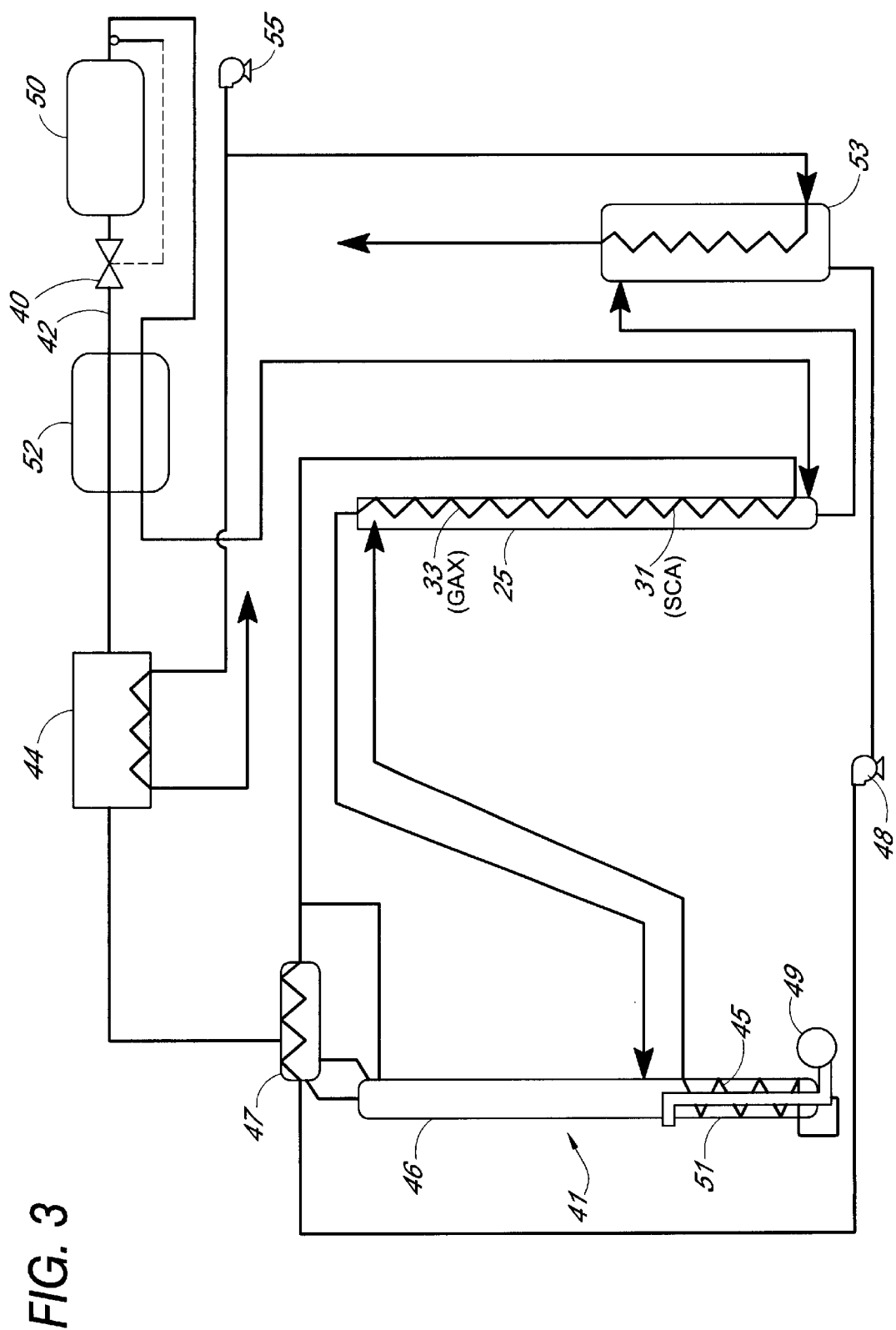

FIGS. 2 and 3 schematically illustrate aqua-ammonia cooling and heating systems in which the solution pump described herein may be effectively utilized. FIG. 2 shows an air conditioner/chiller cooling apparatus and FIG. 3 illustrates a heat pump for operating in a heating mode. The major components of the chiller system embodiment illustrated include an absorber assembly 29 comprising an air-cooled absorber 43 and an absorber heat exchange section 25 which includes an absorber heat exchanger 31, sometimes referred to as a solution cooled absorber (SCA), and a GAX heat exchanger 33. The generator assembly 41 shown includes a generator heat exchanger 45, a boiler 51 having a burner 49 for heating and vaporizing the solution, an adiabatic section 46, and a rectifier section 47. The burner may include a combustion air pre-heater. A condenser 44 and an evaporator 50 are the other major components of the system. The chiller system shown includes a subcooler 52 for precooling refrigerant from the condenser with cold gaseous refrigerant from the evaporator. A TXV 40 located along the refrigerant pipe 42 controls the flow of refrigerant to the evaporator. The absorber and condenser heat exchangers may be air or liquid cooled, and the rectifier 47 may be cooled by solution, water or air. Such a GAX chiller is well-known in the art, for example, U.S. Pat. Nos. 5,490,393 and 5,367,884, and in the aforesaid Modahl et al. publication, the descriptions of which are incorporated herein by reference.

The heat pump embodiment shown in FIG. 3 incorporates many of the same major components described in the FIG. 2 apparatus, but in which a hydronically cooled absorber 53 is shown, with a hydronic pump 55 and appropriate piping for directing a heat transfer fluid to the absorber and to the condenser for recovering heat. In both embodiments shown, a plunger-driven diaphragm solution pump 48 is used for pumping ammonia-rich absorption fluid from the absorber to the rectifier. Such a heat pump may be modified to provide heating and cooling by incorporating an appropriate reversing valve, as described in the aforesaid patents. The solution pump described herein may be used, as well, in an aqua-ammonia chiller-heater as further described in U.S. patent application Ser. No. 09/479,277, filed Jan. 5, 2000, (ROCKYR.099A) the description of which is incorporated herein by reference. Moreover, the solution pump as described herein may also be used in non-GAX aqua-ammonia systems such as described in the aforesaid patents and applications.

The plunger-driven diaphragm solution pump described herein is used in an aqua-ammonia absorption system for pumping an absorption fluid having an ammonia concentration of between about 20% and about 60%, by weight, particularly a GAX absorption system, and more particularly a heat pump system which operates at both high temperature, high pressure and low temperature, low pressure modes of operation. Such a pump offers significant advantages in that at relatively low temperature operation, where pressures are often less than ambient, e.g., less than about 14 psia, and even as low as about 8–10 psia during cold temperature operation, the pump functions efficiently, unlike presently used hydraulically operated diaphragm solution pumps. The pump described herein is capable of pumping ammonia-rich solution flows of between about 2 and about 8 pounds per minute for a 2½–8-ton rated apparatus. Low-side system pressures in which the pump efficiently operates are between about 8–10 psia and about 80 psia, for example when outside temperatures are particularly cold, for example, at about −20° F. Thus, the pump is capable of pumping at required flowrates at low temperature, low pressure conditions, and whereby large ΔPs are achieved at low flows as well. Because the plunger-driven diaphragm pump is provided with a spring for returning the diaphragm during pump operation, the pump is capable of pumping the absorption fluid at subatmospheric solution pressures, thereby providing pumping of the absorption solution at low ambient temperatures below 40° F. and as low as −20° F. and below. Moreover, the pump described herein is capable with providing ΔP over 300 psia, and up to 350 psia or more. Operating frequencies of the pump, that is the reciprocating cycle of frequencies of the plunger, are between about 50 and about 250 strokes per minute, and preferably between about 80–200 strokes, and more preferably between about 90 and about 130 strokes per minute. The pump may be operated even at dry or near dry conditions to pump gas and gas-liquid mixtures. These, as well as other advantages, will be evident to those skilled in the art.

What is claimed is:

1. An aqua-ammonia absorption apparatus comprising an absorber assembly, a generator assembly, an evaporator, a condenser, an ammonia-water absorption fluid having between about 20% and about 60% ammonia, by weight, and an absorption fluid loop for directing absorption fluid between said absorber assembly and said generator assembly, said apparatus characterized by a plunger-driven diaphragm solution pump comprising a reciprocating plunger, an eccentric bearing communicating with said plunger for reciprocally driving said plunger, a diaphragm for pumping absorption fluid in response to reciprocation of said plunger, a hydraulic fluid chamber on one side of said diaphragm and a replenishment valve cooperating therewith for replenishing hydraulic fluid in said chamber and a spring for biasing the plunger against said eccentric bearing, wherein said pump is capable of pumping absorption fluid therein at subatmosphereic pressure.

2. An apparatus of claim 1 including a refrigerant loop having piping for directing ammonia from the generator assembly to the condenser and from the condenser to the evaporator.

3. An apparatus of claim 2 wherein said absorber assembly includes an absorber, an absorber heat exchanger and a generator/absorber heat exchanger, wherein said absorption fluid loop includes one or more conduits cooperating with said solution pump for directing ammonia-rich absorption fluid from the absorber to the absorber heat exchanger and the absorber/generator heat exchanger.

4. An apparatus of claim 3 comprising a heat pump wherein said condenser and evaporator comprise heat exchangers capable of functioning interchangeably, and including one or more valves cooperating with the refrigerant loop for selectively reversing the flow of refrigerant therein.

5. An apparatus of claim 3 comprising a chiller/heater, wherein said evaporator comprises a heat exchanger capable of functioning as a condenser and an evaporator, and wherein said refrigerant loop includes piping and valving for by-passing said condenser whereby in a heater mode refrigerant vapor by-passes said condenser and is condensed in said heat exchanger to provide heat.

6. An apparatus of claim 1 wherein said diaphragm operatively communicates with said replenishment valve whereby said valve operates to replenish hydraulic fluid in said chamber in response to plunger reciprocation.

7. An apparatus of claim 1 wherein said eccentric bearing comprises a needle bearing.

8. An apparatus of claim 1 wherein said pump is capable of pumping at ΔP over 300 psia.

9. An apparatus of claim 6 wherein said pump is capable of pumping at ΔP over 300 psia.

10. An apparatus of claim 1 wherein said pump is capable of pumping said absorption fluid at a rate of between about 2 and about 8 lbs/min.

11. An apparatus of claim 6 wherein said pump is capable of pumping said absorption fluid at a rate of between about 2 and about 8 lbs/min.

\* \* \* \* \*